United States Patent Office 2,889,687
Patented June 9, 1959

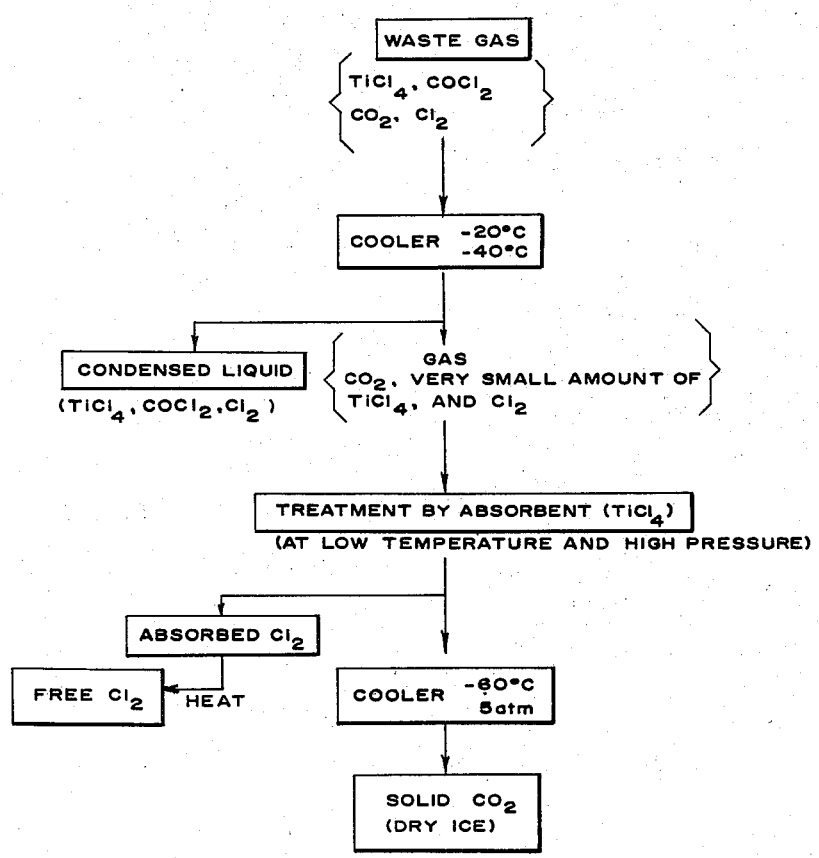

2,889,687

PROCESS FOR THE DISPOSAL OF WASTE GAS FROM THE MANUFACTURE OF TITANIUM TETRACHLORIDE

Hiroshi Ishizuka, Ashiya-shi, Japan

Application November 15, 1954, Serial No. 469,050

1 Claim. (Cl. 62—10)

The present invention relates to a process for the disposal of mixed waste gas from the manufacture of titanium tetrachloride, which waste gas contains carbon dioxide with small quantities of titanium tetrachloride, silicon tetrachloride, phosgene and chlorine.

A process for condensing gaseous titanium in the form of titanium tetrachloride has been carried out industrially, in which process raw material, for example titanium bearing material such as ilmenite, rutile, or titanium slag, is reacted with chlorine with the addition of carboniferrous material at a high temperature, for example from 400° to 800° C. However, if iron, silicon and other impurities are included, these are chloridized and gasified at the same time. The majority of iron chloride is easily separated by a separator. Silicon tetrachloride is fractionated at around 60° C.; and titanium tetrachloride is fractionated at 136° C. However, some unfractionated iron chloride, titanium tetrachloride, silicon tetrachloride, phosgene and chlorine remain in the waste gas which also contains carbon dioxide as its principal constituent. This waste gas is, however, poisonous and presents problems hindering smooth operation since it is not desirable to dispose such harmful waste gas as such.

Various investigations have been conducted to determine how to dispose of this waste gas in a practical and safe manner. However, up till the present invention this has not been accomplished industrially.

It is therefore an object of the present invention to provide a process for the disposal of mixed waste gas from the manufacture of titanium tetrachloride which can be easily practiced industrially.

With this and other objects and advantages in view, my invention briefly comprises cooling the mixed waste gas to a low temperature at which the phosgene and a majority of the titanium tetrachloride and chlorine is liquified and separated, then treating the resultant waste gas with a chloride as absorbing agent at a low temperature and under high pressure to absorb the impurities, and finally cooling the purified gas containing principally carbon dioxide, under high pressure to obtain Dry Ice.

A more detailed description of my improved process now follows with reference to the accompanying drawing which is a flow diagram illustrating the novel steps of my process.

Referring more particularly to the drawing, the waste gas, which is shown comprising carbon dioxide, titanium tetrachloride, phosgene and chlorine, is first cooled in a cooler to a low temperature from —20° to —40°. At this temperature the phosgene and a major portion of the titanium tetrachloride and chlorine are condensed and separated from the waste gas, leaving carbon dioxide and a small quantity of titanium tetrachloride and chlorine as components of the waste gas. It should be noted here that the above mentioned cooling temperature range may be higher if the pressure is set sufficiently high. The condensation product may be recovered by fractional condensation separately.

As shown in the drawing, the waste gas, containing carbon dioxide and only a small amount of titanium tetrachloride and chlorine, is then treated with a chloride as an absorbing agent, which, as shown in the drawing, may be titanium chloride, in order to absorb the remaining impurities to leave carbon dioxide as the principal constituent of the waste gas. This treatment is carried out at a low temperature and high pressure. As shown, the absorbed chlorine may then be recovered separately by heating.

The waste gas, having been thus purified and consisting principally of carbon dioxide is then cooled in a cooler to —60° C. and under pressure of about 5 atmospheres to form solid carbon dioxide or Dry Ice, as shown in the drawing.

Accordingly, it will be seen that according to the process of my invention the constituents of the waste gas are separated in consecutive steps and utilized effectively. Thus, the waste gas, which has heretofore been considered to be poisonous and difficult to dispose of may now be effectively utilized and safely disposed, whereby the present invention has a high industrial value.

What I claim is:

A process for the disposal of mixed waste gas from the manufacture of titanium tetrachloride, which waste gas contains carbon dioxide with small quantities of titanium tetrachloride and chlorine, said process comprising the step of cooling the mixed waste gas to a low temperature from —20° to —40° C., to liquify and separate a major portion of the titanium tetrachloride and chlorine, the step of treating the resultant waste gas with titanium tetrachloride as absorbing agent at a low temperature and under high pressure to absorb the remaining impurities, whereby said waste gas contains principally carbon dioxide, and the step of cooling the purified waste gas under high pressure to obtain Dry Ice.

References Cited in the file of this patent

UNITED STATES PATENTS 2,011,551    Hasche _____ Aug. 13, 1935